Dec. 2, 1924.
J. E. LEWIS
SHIELD
Filed March 21, 1924
1,517,846
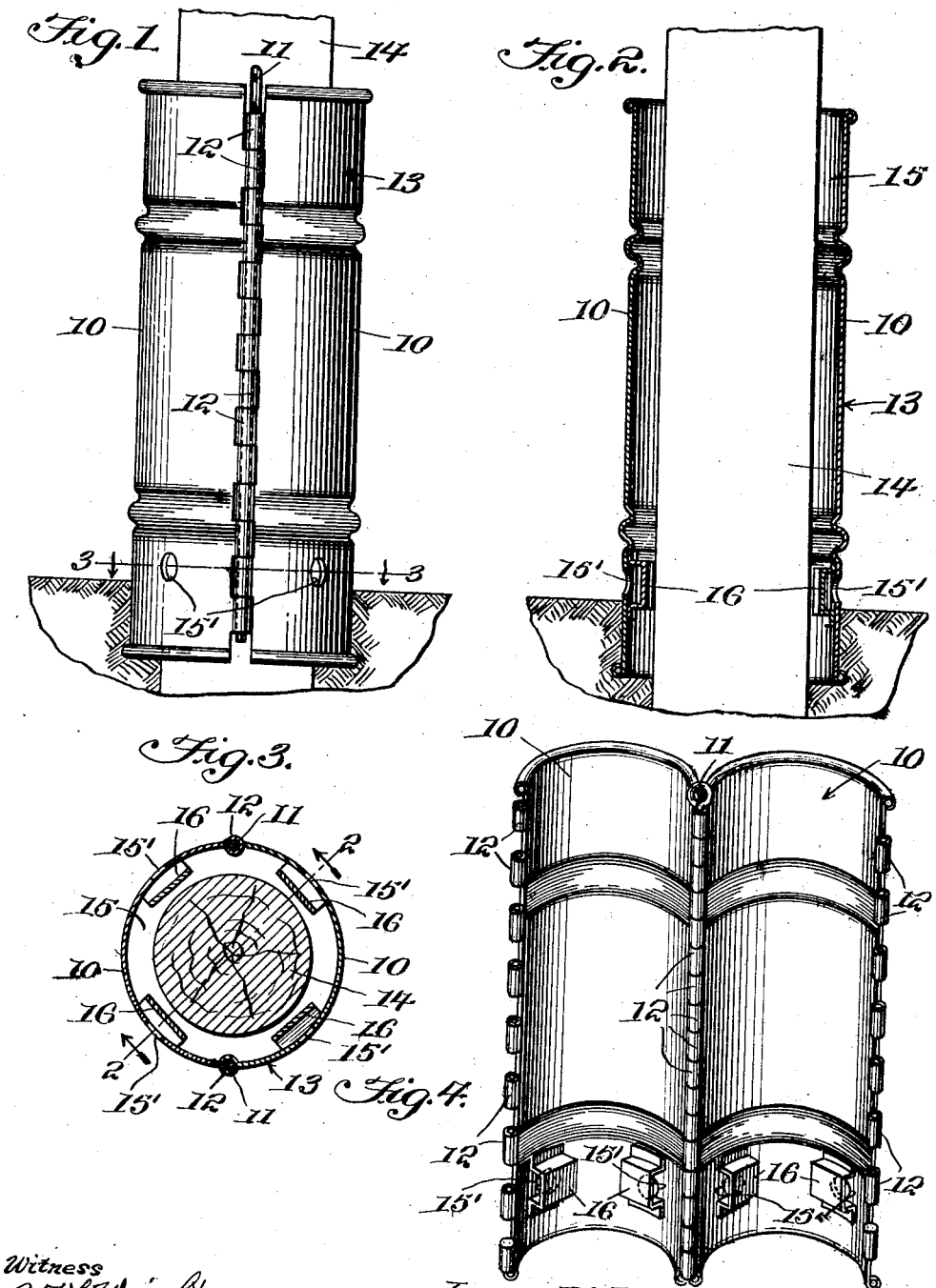
Witness
J. T. L. Wright
Jesse E. Lewis, Inventor
By Victor J. Evans, Attorney Patented Dec. 2, 1924.

1,517,846

UNITED STATES PATENT OFFICE.

JESSE E. LEWIS, OF CLARKSVILLE, TEXAS.

SHIELD.

Application filed March 21, 1924. Serial No. 700,905.

*To all whom it may concern:*

Be it known that I, JESSE E. LEWIS, a citizen of the United States, residing at Clarksville, in the county of Red River and State of Texas, have invented new and useful Improvements in Shields, of which the following is a specification.

This invention relates to improvements in protecting devices especially adapted for poles, posts and the like and has for an object the provision of means which may be removably secured around a pole or post to protect the same from injury by fire and other causes.

Another object of the invention is the provision of a protecting device which may be secured around the pole or post and spaced therefrom to permit of the entrance of air, to keep the post in a dry condition and thus retard decay, means being provided for draining off water or moisture and for preventing a draft through the drainage means, so as to prevent suction of fire into the protector.

With the above and other objects in view, the invention further includes the following novel features and details of construction, to be hereinafter more fully described, illustrated in the accompanying drawings and pointed out in the appended claims.

In the drawings:—

Figure 1 is a side elevation showing the invention in use.

Figure 2 is a vertical sectional view.

Figure 3 is a horizontal section.

Figure 4 is a detail perspective view showing the protecting device open.

Referring in detail to the drawings wherein like characters of reference denote corresponding parts, the protector or shield is preferably formed of sheet metal and comprises separate sections 10 of like construction, the said sections being detachably and hingedly connected by means of bars or pins 11 which pass through spaced eyes 12 provided along the opposite edges of the sections 10. The sections 10 are so shaped as to provide a sleeve 13 when the said sections are connected and this sleeve is adapted to receive and surround a pole 14, or it may be used for the protection of posts or trees.

The diameter of the sleeve is such that an air space 15 is provided between the sleeve and pole so that the latter may be subjected to the drying action of the air, while a horizontal row of spaced openings 15' are provided near the bottom of the sleeve to provide for the drainage of water or moisture from within said sleeve. In positioning the sleeve or protector the lower end is inserted within the ground to a depth to locate the openings 15' directly above the surface of the ground so that water may freely drain therethrough.

Extending across the openings 15' within the sleeve 13 are substantially U-shaped members 16, the latter forming baffles so as to prevent a direct draft upward through the sleeve so that fire will not be drawn through the openings for injury to the pole. In addition, these members 16 serve as spacing elements to space the sleeve from the pole.

In positioning the sleeve, one of the rods or pins 11 is removed and the shield is positioned around the pole and the rod or pin thereafter inserted. This provides a quick and convenient method of applying the device. By removing both of the pins, the sections may be nested so that a number of protectors may be arranged for shipment in a manner to occupy a relatively small space.

The sections are preferably provided with transversely disposed swedged or corrugated portions to stiffen and reinforce the said sections.

The invention is susceptible of various changes in its form, proportions and minor details of construction and the right is herein reserved to make such changes as properly fall within the scope of the appended claims.

Having described the invention what is claimed is:—

1. A shield for poles and the like formed of fire proof material and comprising separate sections, means detachably connecting the sections to provide a pole receiving sleeve, said sleeve having a horizontal row of spaced openings therein to define water outlets and baffles extending across said openings.

2. A shield for poles and the like formed of fire proof material and comprising separate sections, means detachably connecting the sections to provide a pole receiving sleeve, said sleeve having a horizontal row of spaced openings therein to define water outlets and combined baffles and spacing elements extending across said openings.

3. A shield for poles and the like formed of fire proof material and comprising separate sections, means detachably connecting the sections to provide a pole receiving sleeve, said sleeve having a horizontal row of spaced openings therein to define water outlets and substantially U-shaped straps extending across said openings to provide combined baffles and spacing elements.

In testimony whereof I affix my signature.

JESSE E. LEWIS.